United States Patent [19]

Dennison, Jr.

[11] 4,384,282
[45] May 17, 1983

[54] DEVICE FOR INDICATING A FREEZING TEMPERATURE IN A SELECTED LOCATION

[76] Inventor: Everett G. Dennison, Jr., 200 Glenview Rd., Canfield, Ohio 44406

[21] Appl. No.: 246,300

[22] Filed: Mar. 23, 1981

[51] Int. Cl.³ ............................................. G08B 21/00
[52] U.S. Cl. ...................................... 340/580; 340/585
[58] Field of Search ............... 340/580, 585; 317/298, 317/21, 17; 361/170, 160

[56] References Cited

U.S. PATENT DOCUMENTS

| | | | |
|---|---|---|---|
| 2,632,308 | 3/1953 | Engelhardt | 340/580 |
| 3,242,473 | 3/1966 | Shivers, Jr. et al. | 340/580 |
| 3,399,399 | 8/1968 | Apfelbaum | 340/585 |
| 3,896,278 | 7/1975 | Murawski et al. | 340/585 |
| 4,011,552 | 3/1977 | Quirke | 340/585 |

Primary Examiner—Glen R. Swann, III
Attorney, Agent, or Firm—Harpman & Harpman

[57] ABSTRACT

A pair of electrical conductors is positioned in an elongated flexible insulating member and enclosed in an elongated tubular member filled with water or an aqueous solution having a known freezing temperature, the tubular member being sealed at its ends with the electrical conductors in their insulating member extending outwardly of one of the sealed ends and connected with an alarm actuating circuit. A portion of the insulating member is removed from one of the pair of electrical conductors adjacent one end of the same within the tubular member and a portion of the insulating member is removed from the other one of the pair of electrical conductors adjacent the opposite end thereof so that an electrical circuit is completed through the water or aqueous solution in the elongated tubular member and interrupted when the water or aqueous solution freezes.

8 Claims, 5 Drawing Figures

DEVICE FOR INDICATING A FREEZING TEMPERATURE IN A SELECTED LOCATION

BACKGROUND OF THE INVENTION

(1) Technical Field

This invention relates to freezing temperature indicators which will indicate the presence of ice in a water or any aqueous solution having a predetermined freezing temperature.

(2) Description of the Prior Art

An ice detecting system for use in a refrigerated tank in which milk or another liquid is chilled is disclosed in U.S. Pat. No. 2,632,308 and consists of a pair of metallic plates positioned in the tank in spaced relation and connected with a source of electrical current arranged so that the current flows through the milk in the tank until such time as the water in the milk freezes on the plates acting to interupt or lessen the current flow.

U.S. Pat. No. 3,896,278 discloses a device which uses ice to maintain an electrical circuit in open condition, thawing of the ice permitting a conductive element to move to engage a pair of terminals in an alarm circuit so as to complete a circuit therethrough.

U.S. Pat. No. 4,011,552 discloses a temperature sensor incorporating a sensing element such as a thermistor in a closed capsule filled with a liquid that will freeze at a predetermined termperature and connected in an alarm signaling circuit.

The present invention differs substantially from these prior art devices in that the freezing temperature indicator can be of any length so as to supervise any desired area including piping and operates on the novel concept of utilizing an elongated freezable liquid conductor capable of sensing ice formation anywhere along its length and by incorporating sophisticated circuitry can determine the location of the ice in the elongated freezing temperature indicator if desired.

SUMMARY OF THE INVENTION

A freezing temperature indicator comprises an elongated insulating member having a pair of electrical conductors extending longitudinally therein, the conductors and the insulating member being enclosed in an elongated tubular member sealed at its ends and enclosing a liquid having a known freezing temperature. A portion of the insulating member is removed from one of the conductors inwardly of one end of the tubular member and a portion of the insulating member is removed from the other of the conductors inwardly of the other end of the tubular member so that the liquid in the elongated tubular member serves as a conductor for an electrical circuit in connection with said conductors exteriorly of said tubular member.

DESCRIPTION OF THE PREFERRED EMBODIMENT

A freezing temperature indicator which may be extended through a large area such as a refrigerated warehouse or run along pipes in an area susceptible to freezing temperatures, consists essentially of an elongated flexible tubular member 10 formed of synthetic resin or the like which is preferably of a cross sectional size defining a one-eighth inch inner diameter or less and of any desired length. An elongated insulating member 11 has a pair of electrical conductors 12 and 13 extending longitudinally thereof in spaced relation, the insulating member 11 being flexible and formed of a desired synthetic resin and of an outer diameter occupying no more than half of the area within the elongated flexible tubular member 10. Ends 14 and 15 of the elongated tubular member 10 are closed and the interior thereof about the insulating member 11 is filled with a liquid 16 having a known freezing temperature such as water which freezes at 32° F., a 25% ethylene glycol solution which freezes at 10° F., a 33% ethylene glycol solution which freezes at 0° F., and a 45% ethylene glycol solution which freezes at minus 20° F. by way of examples, the ethylene glycol solutions being aqueous or the like.

Figure 1:
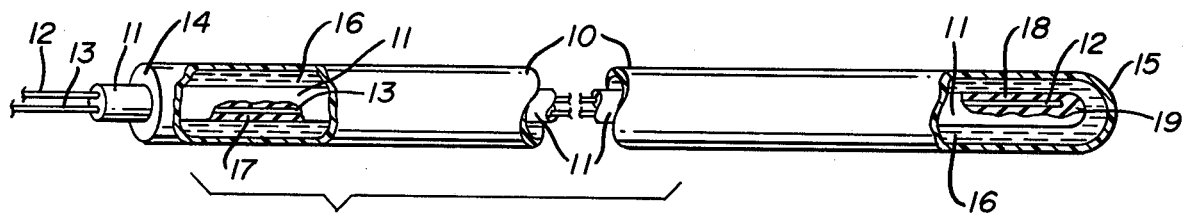
FIG. 1 is a side elevation with parts broken away and parts in cross section.
Figure 4:
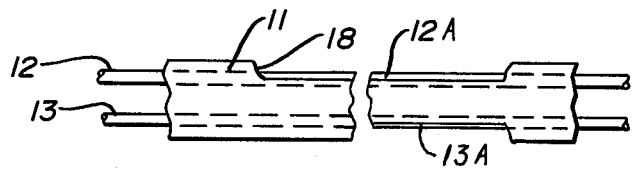
FIG. 4 is an enlarged detail of a portion of the device seen in FIG. 1.

By referring to FIGS. 1 and 4 of the drawings, it will be seen that portions of the insulating member 11 have been removed in the areas thereof indicated by the numerals 17 and 18, adjacent the opposite ends of the elongated insulating member 11 and within the elongated flexible tubular member 10 so as to expose portions of the conductors 13 and 12 respectively which are thereby contacted by the liquid 16 which forms a conductor between the exposed portions of the conductors 12 and 13.

In FIG. 1 of the drawings, the end 14 is shown sealed about the insulating member 11 in a liquid tight manner and the other end 15 is shown sealed to form a liquid tight closure. The insulating member 11 is also sealed as at 19 about the ends of the conductors 12 and 13. An alternate sealing arrangement of the ends of the elongated flexible tubular member 10 may be seen in FIGS. 2 and 3 of the drawings and by referring to FIG. 2 it will be seen that the end 20 of a flexible tubular member 21 has been sealed about the end 22 of an insulating member 23 in which a pair of conductors 24 and 25 extend axially.

Figure 3:
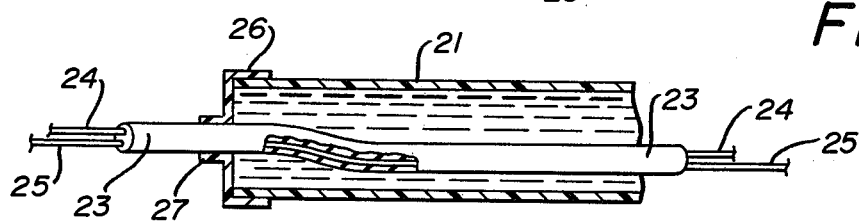
FIG. 3 is an enlarged detail of one end of the device shown in FIG. 1.

In FIG. 3 of the drawings the other end of the flexible tubular member 21 will be seen to have been sealed with a closure 26 having a central opening defined by a flange 27 which is sealed to the insulated member 23. A conducting fluid is confined in the member 21.

Figure 2:
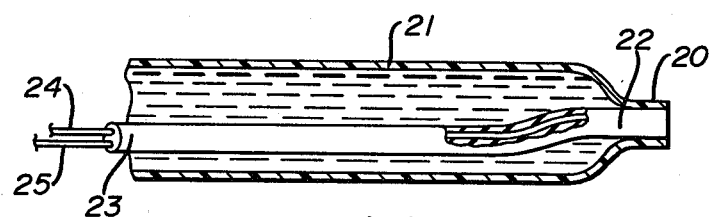
FIG. 2 is an enlarged detail of an alternate end construction of the device shown in FIG. 1.

In order that an alarm may be given when ice forms in any portion of an elongated flexible tubular member 10, an alarm circuit is connected with the electrical conductors 12 and 13 heretofore referred to in FIG. 1 of the drawings, or the conductors 24 and 25 as illustrated in FIGS. 2 and 3 of the drawings.

Figure 5:
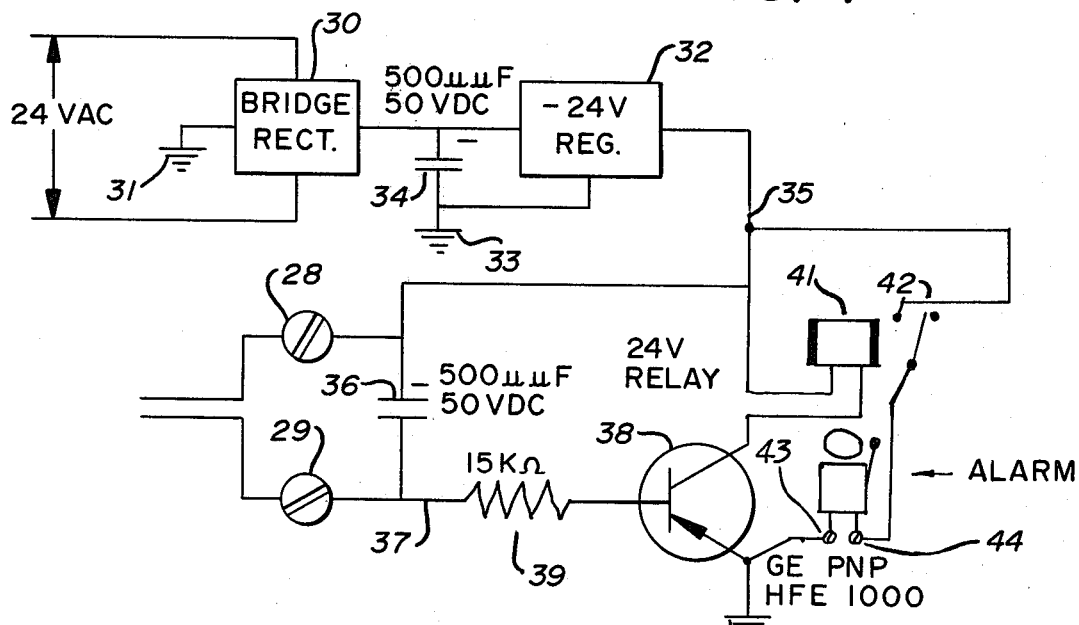
FIG. 5 is a block schematic diagram of an alarm actuating circuit in connection with the freezing temperature indicator of FIGS. 1-4.

By referring now to FIG. 5 of the drawings, a block diagrammatic circuit may be seen to which the conductors 12 and 13 are connected by terminal posts 28 and 29 respectively. The circuit of FIG. 5 of the drawings acts to originate an alarm upon the formation of ice in the liquid 16 in the elongated flexible tube member 10 as hereinbefore described.

In FIG. 5 of the drawings, a 24 volt AC source of current is shown in connection with a bridge rectifier 30 which is grounded as at 31. The bridge rectifier 30 is connected with a 24 volt regulator 32 and the connection is grounded as at 33 by way of a 500 mmf 50 volt DC capacitor 34. The current from the regulator 32 connects by way of a conductor 35 with the terminal post 28 and by way of a secondary 500 mmf 50 volt DC capacitor 36 with a conductor 37 which is connected with the terminal post 29 and with a transistor 38 by way of a 15 kΩ resistor 39. One terminal of the transistor 38 is grounded as at 40 and another terminal thereof is connected with a 24 volt relay 41. The relay 41 operates to close a circuit switch 42 which in turn is in connection with secondary terminal posts 43 and 44 respectively to which suitable audible and/or visual alarm devices are connected. The relay 41 also connects with the conductor 35.

In a typical location such as a refrigerated warehouse, the terminals 43 and 44 may supply a signal to an audible and/or visual alarm on the exterior of the warehouse or in an office associated therewith or at a selected remote site.

It will occur to those skilled in the art that the freezing temperature indicator as disclosed herein may be used in connection with supervising temperatures in various environments and including piping systems such as heretofore referred to and that by utilizing a desired aqueous solution and an anti-freeze agent, such as ethylene glycol which is available commercially under the trademark PRESTONE, a product of Union Carbide Corporation, a desired predetermined alarm actuating temperature may be selected at which the freezing temperature indicator will actuate the associated alarm. Alternately aqueous solutions of salts, sugars, and alcohols may be used.

Referring now to FIG. 4 of the drawings an alternate mode of operation can be used wherein the insulation member 11A has portions removed along the length of both pairs of electrical conductors 12A and 13A so that the device can indicate in a frozen environment if melting occurs anywhere along the length of the parallel exposed connectors 12A and 13A through the same electrical circuit.

It will thus be seen that a simple, inexpensive, easily installed freezing temperature indicator has been disclosed which incorporates a novel continuous elongated sensing element and that the sensor element when electrically connected with a suitable alarm initiating circuit such as disclosed herein, comprises an efficient and dependable freezing temperature indicator usable in many locations for indicating a predetermined temperature level.

Although but one embodiment of the present invention has been illustrated and described, it will be apparent to those skilled in the art that various changes and modifications may be made therein without departing from the spirit of the invention and having thus described my invention

What I claim is:

1. A device for detecting a predetermined freezing temperature in a selected location and comprising an alarm means, an elongated tube, an elongated section of insulating material disposed therein and extending outwardly of said tube, a pair of spaced electrical conductors positioned longitudinally in said section of insulating material, the ends of said tube being sealed, a liquid in said tube having a known freezing temperature, portions of said insulating material being removed from said electrical conductors so as to expose to said liquid a section of one conductor near one end of said tube and a section of the other conductor near the opposite end of said tube, said electrical conductors connected with said alarm means, said alarm means arranged to initiate an alarm upon ice forming in said liquid 2. The device for detecting a predetermined freezing temperature set forth in claim 1 wherein said elongated section of insulating material extends outwardly of one end of said tube.

3. The device for detecting a predetermined freezing temperature set forth in claim 1 and wherein said elongated tube is a flexible synthetic resin tubular member.

4. The device for detecting a predetermined freezing temperature set forth in claim 1 and wherein said elongated section of insulating material is flexible synthetic resin member with said electrical conductors embedded therein.

5. The device for detecting a predetermined freezing temperature set forth in claim 1 wherein said liquid is water.

6. The device for detecting a predetermined freezing temperature set forth in claim 1 wherein said liquid is an aqueous solution of a material selected of a group consisting of salts, sugars, and alcohols.

7. The device for detecting a predetermined freezing temperature set forth in claim 1 wherein said liquid is an aqueous solution of ethylene glycol.

8. A device for detecting a predetermined freezing temperature in a selected location and comprising an alarm means, an elongated tube, a section of insulating material disposed in said tube and extending outwardly of one end thereof, a pair of spaced electrical conductors in said section of insulating material, at least one of said electrical conductors extending longitudinally of said tube to a point adjacent the other end thereof, the ends of said tube being sealed, a liquid in said tube having a known freezing temperature, portions of said insulating material being removed from said electrical conductors so as to expose to said liquid a section of one conductor near said one end and a section of the other conductor (to said liquid) near the opposite end of said tube, said electrical conductors connected with said alarm means, said alarm means arranged to initiate an alarm upon ice forming in said liquid.

* * * * *